United States Patent [19]

Brendel

[11] 4,319,650

[45] Mar. 16, 1982

[54] LOAD CELL SCALE

[75] Inventor: Albert E. Brendel, Lake Orion, Mich.

[73] Assignee: Sensor Developments, Inc., Lake Orion, Mich.

[21] Appl. No.: 184,449

[22] Filed: Sep. 5, 1980

[51] Int. Cl.³ ............................................ G01G 23/02
[52] U.S. Cl. .................................... 177/156; 177/187
[58] Field of Search ................ 177/154, 156, 187, 189

[56] References Cited

U.S. PATENT DOCUMENTS 4,058,179  11/1977  Price ..................................... 177/156
4,254,841  3/1981   Loskill ............................. 177/154 X
4,273,203  6/1981   Blawert et al. ..................... 177/187

Primary Examiner—George H. Miller, Jr.
Attorney, Agent, or Firm—Cullen, Sloman, Cantor, Grauer, Scott & Rutherford

[57] ABSTRACT

A scale for precise weighing measurements utilizing a strain gauge load cell includes a weighing platform which is cantilevered to one side of the load cell in order to permit a high profile load cell to be used while retaining a low platform height. An overload protection system causes the platform to bottom out against a fixed supporting base when a predetermined load is exceeded.

4 Claims, 6 Drawing Figures

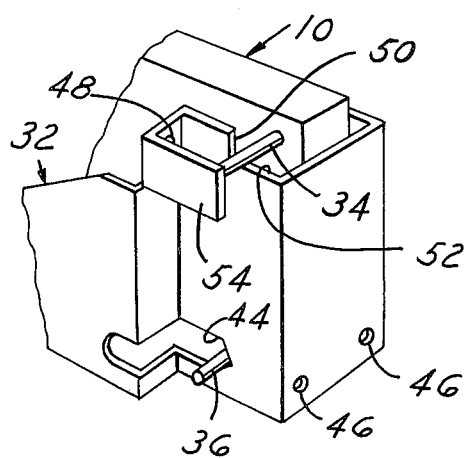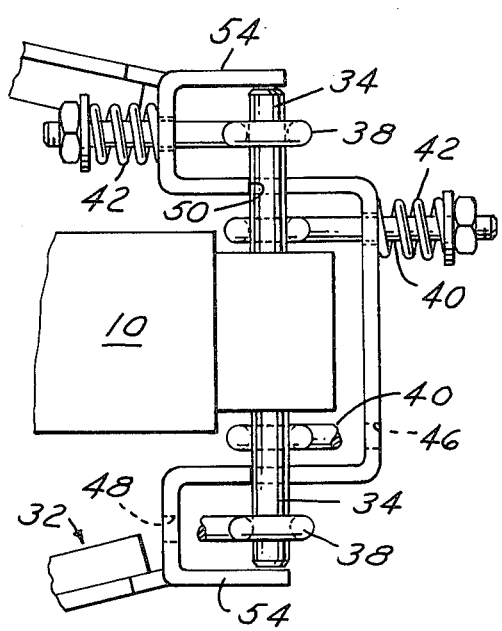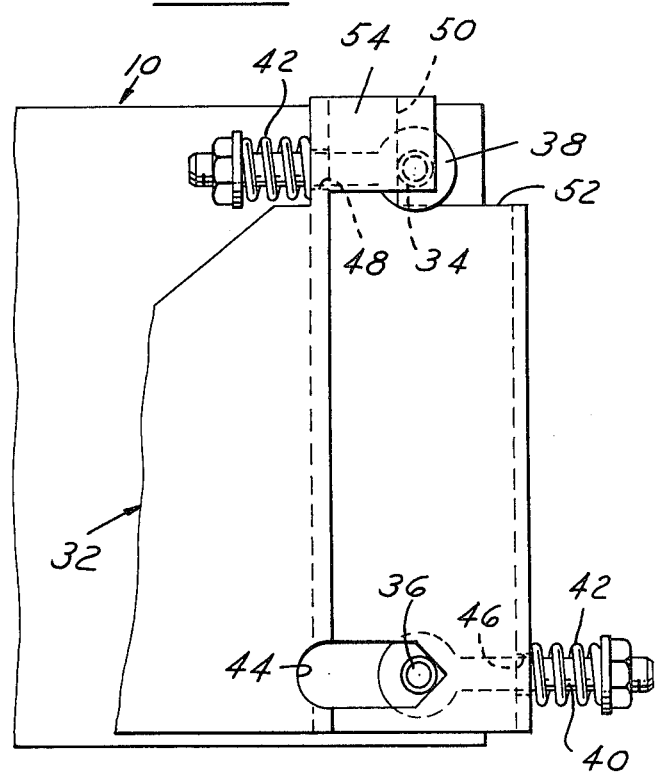

LOAD CELL SCALE

BACKGROUND OF THE INVENTION

It is desirable that strain gauge load cells utilized in weighing systems have as high a profile as possible, in order to provide maximum vertical spacing between upper and lower flexure beams which aid in isolating the strain gauge-equipped sensing beam from extraneous forces and bending moments. An example of such a load cell is illustrated in my prior U.S. Pat. No. 4,181,011.

However, the high profile preferred for the load cell is incompatible with the low profile desired for the weighing platform, the latter being preferred to minimize the inconvenience and effort required in moving the object to be weighed on and off the scale platform.

It is also desirable that strain gauge load cells be provided with an overload protection system to prevent excessive loads from damaging the strain gauges or the load cell structure itself.

Accordingly, the primary objects of the present invention are the provision of an improved load cell permitting maximum load cell profile height and minimum weighing platform height, along with a safe and reliable overload protection system.

SUMMARY OF THE INVENTION

The weighing platform of the scale is cantilevered to one side of the load cell, and is normally maintained in a resilient free-floating condition by means of compression springs exerting equal and opposite horizontal preload forces between the load cell and the platform. A lower mounting point between the platform and a yieldable member of the load cell normally provides both horizontal and vertical reaction forces, while an upper mounting point normally provides only a horizontal reaction force. When a predetermined load is exceeded, the pre-load biasing force of the compression springs is overcome, causing the platform to bottom out on a fixed base and to by-pass the excessive vertical loads safely around the load cell.

BRIEF DESCRIPTION OF THE DRAWINGS

FIG. 4 is a perspective view of a portion of the weighing platform and load cell, showing a portion of the mounting structure.

FIG. 5 is a fragmentary plan view of the details of the mounting between the weighing platform and the load cell.

FIG. 6 is a side view of the structure of FIG. 5.

DETAILED DESCRIPTION OF THE INVENTION

Figure 1:
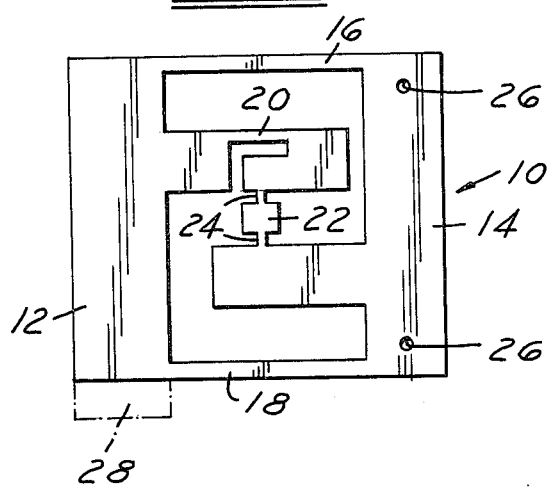
FIG. 1 is a simplified schematic side view of an exemplary load cell which may be utilized in conjunction with the present invention.

Referring to FIG. 1, there is illustrated in simplified schematic form a suitable load cell for use in a weighing scale. The load cell is described in further detail in my earlier U.S. Pat. No. 4,181,011.

Briefly, load cell 10 comprises a fixed end constraint 12 and a movable end constraint 14 interconnected by upper and lower horizontal flexure beams 16, 18 as well as by a cantilevered sensing beam 20. The left end of sensing beam 20 forms an extension of fixed end constraint 12, while the right end of sensing beam 20 is loaded in a vertical direction by means of a load directing flexure 22 having neck portions 24 of reduced thickness in the horizontal direction in order to absorb horizontal loads and isolate sensing beam 20 therefrom. Movable end constraint 14 is provided with a pair of pin-receiving holes 26 through which the vertical load to be measured is transmitted into end constraint 14 and through flexure 22 into sensing beam 20. Sensing beam 20 is adapted to have strain gauges bonded to its horizontal surfaces for measuring the tensile and compressive strains induced by the vertical applied load, as will be understood by those skilled in the art.

Fixed end constraint 12 is rigidly secured to a base spacer 28, and it will be recognized that the structure generally defined by elements 12, 14, 16 and 18 functions as a parallelogram, the latter three sides of which are movable vertically relative to fixed end constraint 12.

Referring now to FIGS. 2-6, the base spacer 28 is secured to base 30 of the scale, and projects slightly above the rest of the base, for purposes to be described below. Scale platform support 32 is cantilevered horizontally toward the left from load cell 10, which is viewed from the same side in FIG. 2 as in FIG. 1. Platform support 32 is connected to the load cell by means of a resilient system including upper and lower pins 34, 36 which are received by holes 26 in the load cell and on which are pivotally mounted upper and lower eye bolts 38, 40. Each of the eye bolts retains a compression spring 42 between a nut and washer at the threaded end of the bolt and a portion of platform support 32, as will be described below. Lower pin 36 is received within slot 44 of platform support 32 as best shown in FIGS. 4 and 6. Lower eye bolts 40 project through clearance holes 46 in platform support 32, as shown in FIG. 6, and lower compression spring 42 thus is compressed against that vertical wall of platform support 32 immediately surrounding clearance hole 46. In this fashion, the lower compression spring biases platform support 32 toward the left, as viewed in FIG. 6, relative to laterally immovable eye bolt 40, forcing lower pin 36 into the V-groove at the right end of slot 44. The shape of this slot enables both horizontal and vertical forces to be generated at this interface.

Upper eye bolts 38 pass through clearance holes 48 in platform support 32, and it will be recognized that upper compression springs 42 generate a rightward force on platform support 32, which forces vertical edge 50 of platform support 32 into engagement with upper pin 34. It should be noted that there is no contact between upper pin 34 and horizontal edge 52 of platform support 32 (see FIGS. 2, 4 and 6).

As best shown in FIGS. 4-6, the relative length of upper pin 34 and the space between the inner opposed faces of centering flanges 54 of platform support 32 permit pin 34 to be freely received between flanges 54, but such flanges function to keep platform support 32 centered, in plan view, on load cell 10.

Figure 2:
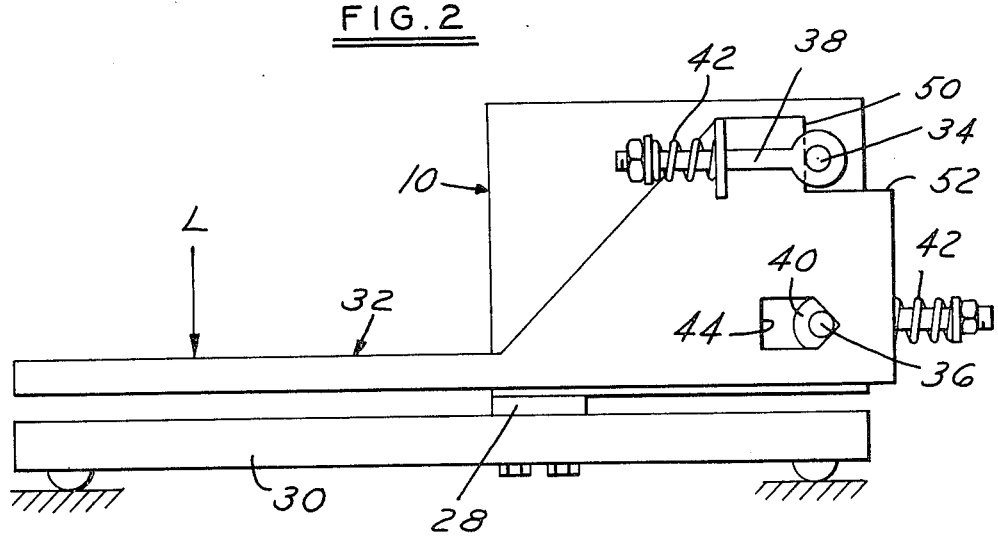
FIG. 2 is a simplified side view showing the load cell, supporting base and weighing platform in their normal configuration.

Referring to FIG. 2, it will be appreciated that the load of an object to be weighed is applied downwardly through the scale platform (not shown) onto the left end of platform support 32, as schematically shown by arrow "L". As long as that load is below the predetermined safe limit, an equal and opposite upward vertical reaction force is applied to the right end of platform support 32 at the point of tangency of lower pin 36 with the inclined upper face of the V-groove of slot 44. As will be understood by those skilled in the art, if moments are summed about lower pin 36, it will be seen that a horizontal force is applied toward the right against the upper portion of platform support 32 by upper compression string 42. This rightward horizontal force must be offset by an equal and opposite leftward horizontal force applied by lower compression spring 42 against platform support 32.

As long as load "L" is below a predetermined amount, the pre-load force of the compression springs is sufficient to keep the platform support 32 in the position shown in FIGS. 2 and 6, with upper pin 34 bearing against the vertical edge 50 and lower pin 36 nested into the V-groove of slot 44. In this condition, platform support 32 remains spaced above base spacer 28 and base 30. The load of the weighed object is transmitted into vertically yieldable end constraint 14 of load cell 10 by means of the downward force of platform support 32 on lower pin 36. The nut and washer on each eye bolt provide a convenient means for adjusting the magnitude of the pre-load biasing force.

Figure 3:
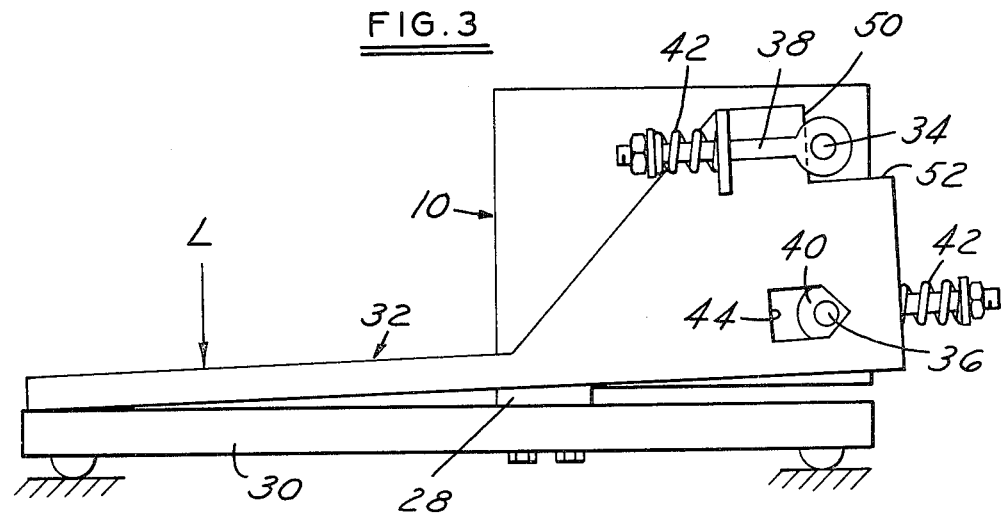
FIG. 3 is a view similar to FIG. 2, but showing the position of the weighing platform in an overload condition.

As load "L" increases, a point is reached when the pre-load biasing force of compression springs 42 is exceeded and platform support 32 pivots counter-clockwise and downwardly on the left until it bottoms out on base 30 and base spacer 28, as shown in FIG. 3. When this condition is reached, upper and lower pins 34, 36 have "collapsed" or moved away from their abutting engagement with vertical edge 50 and slot 44, respectively, and thereby transmits no further load into load cell 10.

Those skilled in the art will recognize that as the point of application of load "L" moves further to the left on platform support 32, it will have an increasing tendency to cause collapse of the system into its condition of FIG. 3. This is an advantageous feature because the same relationship of load magnitude and point of application would also increase the load cell-damaging potential.

As an alternative to coil springs, Belleville washers could be used for higher capacities. Another alternative construction could reverse the illustrated location of V-slot 44 and vertical edge 50, so that the V-slot would receive and engage upper pin 34, while vertical edge 50 would engage lower pin 36.

This invention may be further developed within the scope of the following claims. Accordingly, the above specification is to be interpreted as illustrative of only a single operative embodiment of this invention, rather than in a strictly limited sense.

I NOW CLAIM:

1. In a weighing system of the type utilizing a strain gauge load cell whose height is greater than the elevation of a weighing platform means to which it is connected, the load cell having a fixed first portion which is rigidly mounted to a fixed underlying base and the load cell further having a second portion connected to the first portion by resilient members which permit the second portion to resiliently yield in the vertical direction in response to vertical forces applied thereto by the weighing platform means, the second portion being essentially unyieldable in all other directions, an improved means for interconnecting the platform means and load cell and for protecting the load cell against overloads comprising:

the platform means having a load-receiving portion extending laterally from the load cell at an elevation which is below the upper portion of the load cell, said load-receiving portion being normally spaced above the fixed base;

said platform means further having upper and lower vertically spaced load cell-engaging portions for normally supporting said platform means solely from the load cell and transmitting all loads less than a predetermined magnitude to the load cell;

one of said upper and lower load cell-engaging portions comprising first abutment surface means which are resiliently biased in a horizontal direction into engagement with the second portion of the load cell, said one load cell-engaging portion being incapable of transmitting any vertical force components to the load cell;

the other of said upper and lower load cell-engaging portions comprising second abutment surface means which are resiliently biased in a horizontal direction into engagement with the second portion of the load cell, said horizontal resilient bias being in a direction opposite to the resilient bias of said first abutment surface means, and said second abutment surface means being capable of transmitting both horizontal and vertical force components to the second portion of the load cell;

vertical loads in excess of said predetermined magnitude creating horizontal forces at said upper and lower load cell-engaging portions which exceed the pre-load force of said resilient biasing forces, causing said first and second abutment surfaces to disengage from the load cell, and said platform means to bottom out against the fixed base.

2. The weighing system of claim 1 wherein the resilient biasing forces are generated by coil springs whose opposite ends engage the load cell and the platform means, respectively.

3. The weighing system of claim 1 wherein said first abutment surface means comprises a vertical edge and said second abutment surface means comprises a V-shaped slot into which a generally cylindrically shaped extension of the second portion of the load cell normally nests.

4. In a weighing system of the type utilizing a strain gauge load cell whose height is greater than the elevation of a weighing platform means to which it is connected, the load cell having a fixed first portion which is rigidly mounted to a fixed underlying base and the load cell further having a second portion connected to the first portion by resilient members which permit the second portion to resiliently yield in the vertical direction in response to vertical forces applied thereto by the weighing platform means, the second portion being essentially unyieldable in all other directions, an improved means for interconnecting the platform means and load cell and for protecting the load cell against overloads comprising:

the platform means having a load-receiving portion extending laterally from the load cell at an elevation which is below the upper portion of the load cell, said load-receiving portion being normally spaced above the fixed base;

said platform means further having upper and lower vertically spaced load cell-engaging portions for normally supporting said platform means solely from the load cell and transmitting all loads less than a predetermined magnitude to the load cell;

said upper load cell-engaging portion comprising a vertical abutment surface which is normally resiliently biased in a horizontal direction into abutting tangential engagement with an upper pin extending from the second portion of the load cell, said upper pin having an upper eye bolt pivotally mounted thereon which in turn carries a compression spring compressed between the threaded end of the eye bolt and a portion of the platform means to normally bias the upper portion of said platform means and said vertical abutment surface in a first horizontal direction into engagement with said upper pin, said upper load cell-engaging portion being incapable of transmitting any vertical force components to the load cell;

said lower load cell-engaging portion comprising a V-shaped slot with the mouth of the slot oriented horizontally in a horizontal direction opposite to said first horizontal direction, the walls of said slot being normally resiliently biased in said opposite horizontal direction into abutting tangential engagement with a lower pin extending from the second portion of the load cell, said lower pin normally nesting into said slot to engage both inclined surfaces thereof so as to be capable of transmitting both horizontal and vertical force components thereto, said lower pin having a lower eye bolt pivotally mounted thereon which in turn carries a compression spring compressed between the threaded end of the eye bolt and a portion of the platform means to normally bias the lower portion of said platform means and said slot walls in said opposite horizontal direction into engagement with said lower pin;

said upper and lower compression springs applying a pre-load force sufficient to maintain engagement at said upper and lower load-cell engaging portions when the vertical load applied to the weighing platform means is less than a predetermined magnitude;

vertical loads less than said predetermined magnitude applied to the platform means being absorbed solely by the load cell by means of an equal and opposite vertical force applied by said lower pin to said slot walls and by means of equal and opposite horizontal forces applied by said upper and lower pins to said vertical abutment surface and said slot walls, respectively;

vertical loads in excess of said predetermined magnitude creating horizontal forces at said upper and lower load cell-engaging portions which exceed said pre-load force of said compression springs, causing said upper and lower load cell-engaging portions to disengage from said upper and lower pins, respectively, and said platform means to bottom out against the fixed base.

* * * * *